United States Patent [19]

Toelke

[11] Patent Number: 4,458,522

[45] Date of Patent: Jul. 10, 1984

[54] HYDROSTATIC PIPE TESTER AND METHOD

[75] Inventor: Lester W. Toelke, Houston, Tex.

[73] Assignee: International Tool & Supply Co., Inc., Houston, Tex.

[21] Appl. No.: 373,637

[22] Filed: Apr. 30, 1982

[51] Int. Cl.³ .............................................. G01M 3/04
[52] U.S. Cl. ...................................... 73/49.5; 73/49.6
[58] Field of Search ...................... 73/49.5, 49.1, 49.6; 138/90

[56] References Cited

U.S. PATENT DOCUMENTS

| | | | |
|---|---|---|---|
| 2,017,393 | 10/1935 | Boax et al. | 73/49.5 |
| 2,655,182 | 10/1953 | Hayes et al. | 73/49.5 |
| 2,934,943 | 5/1960 | Carrie | 73/49.6 |
| 2,947,165 | 8/1960 | Kirchner et al. | 73/37 |
| 3,334,515 | 8/1967 | Kost | 73/49.5 |
| 3,710,628 | 1/1973 | Horton | 73/49.5 |
| 3,877,293 | 4/1975 | McKeage | 73/49.5 |
| 4,192,177 | 3/1980 | Crickard et al. | 73/49.1 |
| 4,211,107 | 7/1980 | Sleeter et al. | 73/49.6 |
| 4,326,406 | 4/1982 | Smith | 73/49.1 |

FOREIGN PATENT DOCUMENTS 1380684  10/1963  France ................................. 73/49.5

*Primary Examiner*—Gerald Goldberg
*Assistant Examiner*—Hezron Williams
*Attorney, Agent, or Firm*—Arnold, White & Durkee

[57] ABSTRACT

A hydrostatic pipe tester is especially designed for testing pipe at high pressures safely. Threaded tension rods are supported on both sides of the pipe under test such that their axes are coplaner with the pipe under test, and coupling assemblies couple the pipe under test to the threaded tension rods within the plane. A novel bleeding assembly and a novel check valve is also disclosed.

10 Claims, 10 Drawing Figures

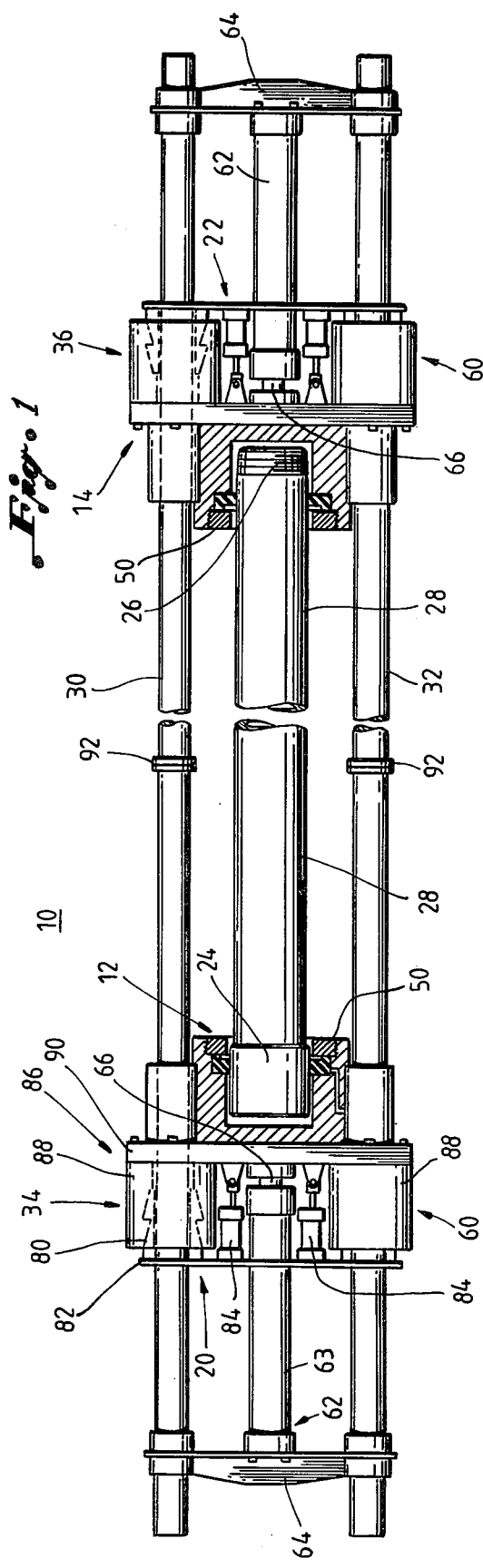
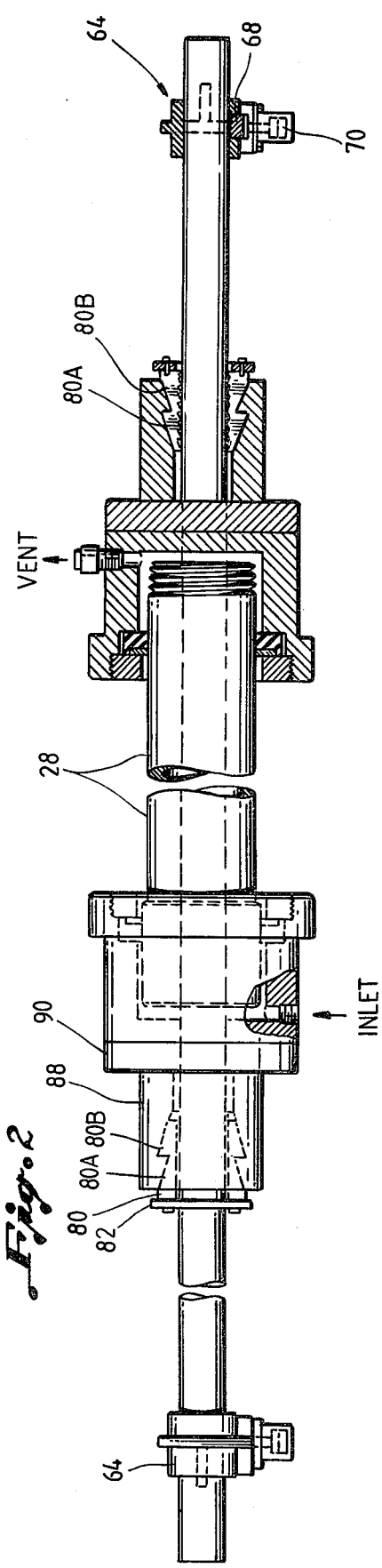

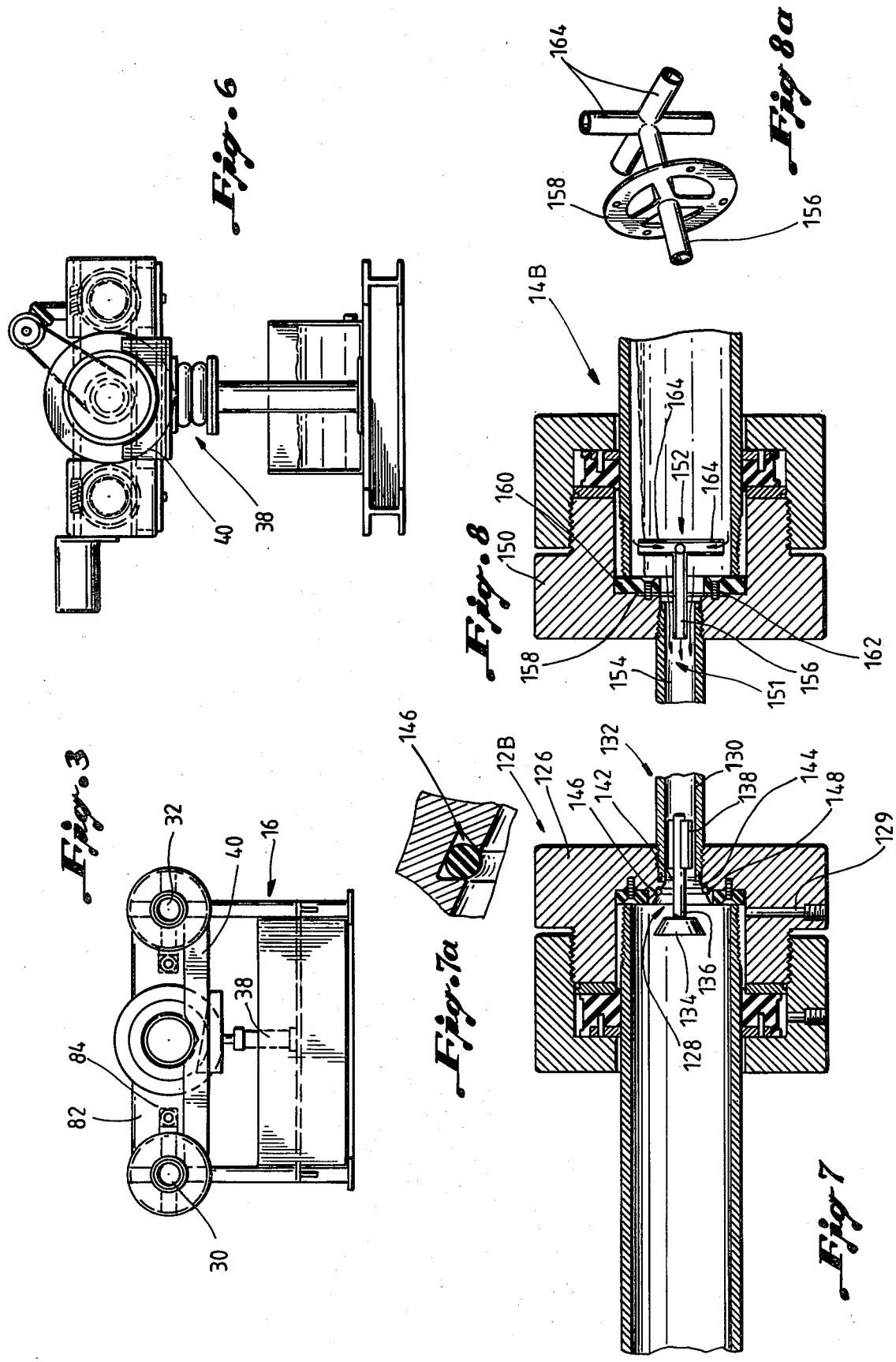

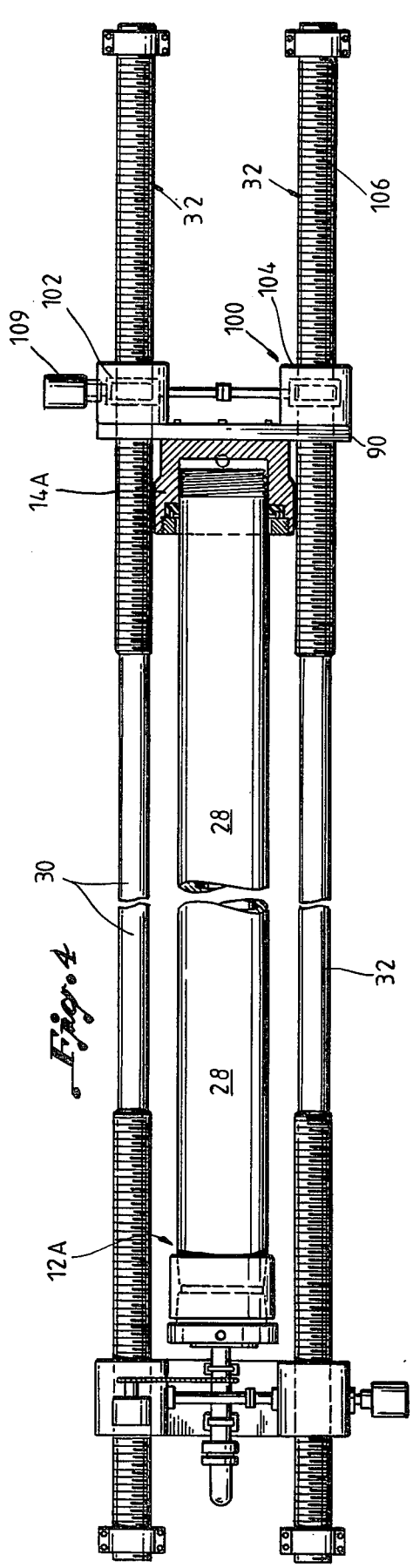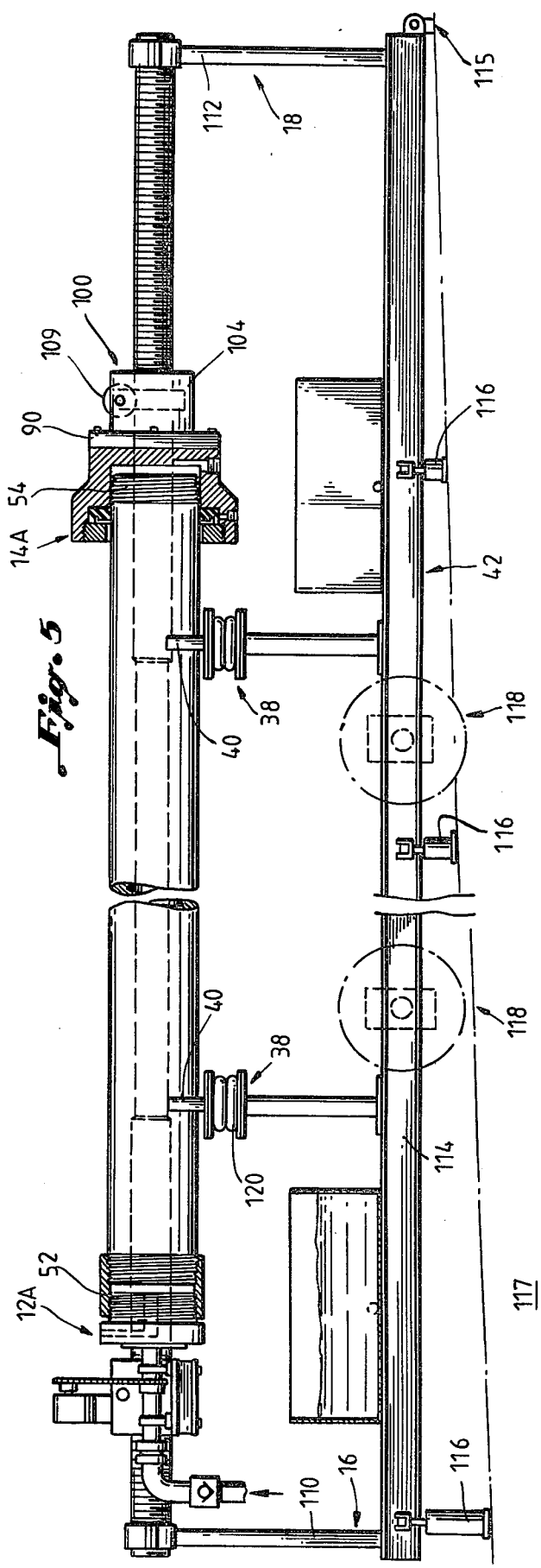

HYDROSTATIC PIPE TESTER AND METHOD

BACKGROUND OF THE INVENTION

This invention relates to testers for industrial pipe and other tubular goods and more specifically relates to such testers which apply hydrostatic pressures to the pipe under test.

As used herein the term "pipe" relates to tubular goods including drill pipe, casing production pipe, and other industrial tubulars utilized to transfer fluids from one location to another location. The term "water" as used herein is understood to include any non-compressible fluid suitable for implementing the hydrostatic testing of pipe described herein.

The need for testing both new and used pipe hydrostatically has been recognized, and various systems have been proposed in an attempt to satisfy the need. The need is especially apparent in the oil industry wherein several thousand feet of such pipe traditionally is run into the borehole and encounters tremendous loading conditions. Improper testing can fail to detect troubles which appear in such harsh usage.

Several thousand feet of pipe run into a borehole creates tremendous tensile loading conditions on the pipe. Some prior art testers have employed compressive forces on the pipe to retain the test head on the ends of the pipe during testing. These do not place a tensile loading onto the pipe while under internal pressure. Testing the pipe in this manner will not provide the harsh tensile loading condition to which it will be subjected in the well. Rather, such a compressive columnar load may create residual stresses in the pipe which could create future problems with axial loading.

Some users may prefer a means of testing pipe that does not stress the threads during testing. Others may prefer to have the pipe in an axial stress condition caused by the test. Further, many users prefer that the hydro test not put any stress on the threads with the thought that the test "plug" changes the mechanical characteristics of the thread. However, the structure of the machine using essentially the same structure allows a simplified conversion from a threaded test arrangement to a nonthreaded test assembly.

There are other improper tests which also can directly cause future troubles when placed into such a harsh environment as a borehole. For example, a common way to hydrostatically test a pipe is to employ a threaded test head screwed onto the threads on the end of the pipe under test. First, a cross threaded connection can damage the threads. Second, if insufficient torque to the threaded connection is initially applied, leakage can occur during testing. The application of additional torque while under pressure may likewise damage the threads. Such damaged threads can eventually leak or strip to cause failure of the coupling in the borehole due to the tremendous forces imposed on the pipe in the borehole.

Further, test heads become worn and may have poorly fitted or non-gaged threads which can cause thread distortion. The thread is deformed by coining or cold forging to cause a very low strength connection. Even though the pipe under test will accept a mating thread in later application, it is unlikely to have the integrity of a properly gaged nonstressed thread. It thus is likely to fail in later application.

Another important aspect of hydrostatically testing pipe is safety. Hydraulic pressures as high as 15,000 pounds per square inch may be required during hydrostatic testing. If the threaded test head is not adequately anchored to the pipe under test, the test head may blow off at very high hydraulic pressures; i.e. especially likely when threads become worn or crossed. Since the test heads may weigh up to 100 lbs, and since such a test head blowing off the pipe under test may be hurled at a velocity of several hundred feet per minute due to the high pressure, there is an extreme hazard both to the testing equipment and to human safety.

Many prior art testers have required bulky, extremely heavy support structures due to the high pressure requirement. Such prior art structures not only have been prohibitively expensive for many applications, they have been unsuitable for portable application, such as field usage.

Accordingly, the need remains for a suitable hydrostatic pipe tester of a lightweight design which allows portability yet which provides adequate testing conditions and assurances of safety to the operator.

SUMMARY OF THE INVENTION

The present invention provides a lightweight hydrostatic tester capable of testing pipe both adequately and safely. Because of the lightweight, less massive design, it is suitable for portable, field usage and is less expensive.

According to one aspect of the present invention, a tester for hydrostatically testing a length of pipe is provided. First and second test heads are configured to connect to the respective ends of the length of pipe for applying hydrostatic pressure thereto during testing. First and second spaced support assemblies are provided, and first and second elongated stress members connect the first and second spaced support assemblies. An elevating mechanism is provided for supporting the length of pipe under test to have its axial centerline substantially coplaner with those of the stress members. A positioning mechanism movably supports the first and second test heads with respect to the stress members and the support assemblies to allow the respective test heads to advance for engaging the respective pipe ends. A coupling mechanism couples the positioning mechanism and the stress members for transferring preferably equally to the stress members the axial forces applied during testing to said test heads.

The coupling mechanism releasably secures the respective test heads to the lateral stress members by either clamps or a screw mechanism. Collet assemblies are provided when using clamping members, and male/female threaded members are employed when using the screw mechanism.

The elevating mechanism preferably is configured to tilt one end of a support bed which in turn tilts one end of the pipe prior to testing for facilitating filling of the pipe with hydrostatic fluid. The mechanism levels the bed and thus the pipe prior to removal of the pipe from the tester.

According to another aspect of the present invention, the test heads are configured to threadingly connect to the respective threaded ends of the pipe under test. The test heads are rigidly supported by a frame, and the pipe under test is movably supported by a pipe support bed. The bed provides horizontal and vertical freedom of movement to the pipe under test to facilitate coupling of the test head to the threaded end of pipe as the pipe is screwed into the test head.

According to another aspect of the present invention, a venting mechanism is provided which vents air from within the pipe under test as the pipe is filled with hydrostatic fluid. The venting mechanism employs an elongated tube positioned to have one end within the pipe under test and the other end outside the pipe. As the pipe is filled with hydrostatic fluid, the air is bled from the pipe by flowing the fluid adjacent the other end of the vent tube. Air within the pipe is drawn through the tube via an eductor employing Bernouli principles and is exhausted at the one end with the bled fluid.

A novel check valve and cooperating seal are provided in the test head through which the fluid is input during filling. The seal includes a rounded member which is secured in place by a trapezoidal shaped retaining opening.

It is thus a general object of the present invention to provide a new and improved hydrostatic pipe tester designed for testing pipe adequately and safely yet with a less amount of bulk.

The above noted and other objects and advantages of the present invention will become apparent from a reading of a detailed description of a preferred embodiment in conjunction with the appended drawings.

BRIEF DESCRIPTION OF THE DRAWINGS

FIG. 1 is a plan view of a hydrostatic pipe tester according to one aspect of the invention;

FIG. 2 is a side elevational view of the pipe tester of FIG. 1;

FIG. 3 is an end view of the pipe tester of FIG. 1;

FIGS. 4 and 5 respectively are plan and side elevational views of a tester having alternative test heads from those on the pipe tester of FIG. 1;

FIG. 6 is an end view of the pipe tester of FIG. 4;

FIGS. 7 and 8 are cross-sectional side views of yet two additional test heads which may be employed on the tester of FIG. 1 or FIG. 4 and which employ respectively a check valve and a venting mechanism;

FIG. 7a is an enlarged cross-sectional view of a seal used in the check valve in FIG. 7; and FIG. 8a is a perspective view of the venting mechanism in FIG. 8.

DESCRIPTION OF A PREFERRED EMBODIMENT

Referring to FIGS. 1-3, a new and improved hydrostatic pipe tester 10 is constructed and arranged according to novel features of the invention. The hydrostatic pipe tester 10 is of a lightweight, reduced mass design which provides adequate testing of pipe yet which allows the pipe to be tested safely. Because of the lightweight design, the pipe tester 10 is suitably employed as a mobile pipe tester, especially adapted for testing pipe in the oil field. However, because its design allows high pressure testing, it suitably is employed in permanent applications, such as mills. The design is readily adapted to accommodate varying pipe lengths, such as from 45 feet to 16 feet ranging from for example 1.9 inch outside diameter tubing to twenty inch outside diameter casing.

The tester 10 includes test head assemblies, 12, 14 which are supported from first and second spaced support assemblies 16, 18. Each of the test head assemblies 12, 14 cooperates with respective positioning assemblies 20, 22 which position the respective test heads for engagement with the ends 24, 26 of a pipe under test 28.

As an outstanding feature of the invention, the tester 10 also includes a pair of elongated stress members 30, 32 extendin between and coupling the respective support assemblies, 16, 18. The positioning assemblies 20, 22 respectively include couplers 34, 36 for securely coupling the test head assemblies 12, 14 to the stress members 30, 32. As another outstanding feature of the invention, an elevating mechanism 38 and a pipe cradle 40 are provided to support the pipe under test at substantially the same elevation as that of the stress members 30, 32. Specifically, and as seen in FIG. 3, the stress members 30, 32 are supported at an elevation such that their respective long axes are coplaner. The pipe cradle 40 supports the pipe under test 28 such that the long axis of the pipe under test is also coplaner with the axes of the stress members 30, 32.

Referring to FIG. 5, the tester 10 preferably includes a tilt mechanism 42. During loading of the pipe under test 28 into the tester 10 and during testing, the pipe under test is positioned at a slight angle, such as one to two degrees, to facilitate bleeding of air from the pipe. After completion of the test, the tilt mechanism 42 levels the tester 10 so that the pipe under test once again become level. This facilitates the unloading of the pipe 28 from the tester 10 after test.

Referring again to the test assemblies 12, 14 of FIGS. 1-2 and 4-5, rather conventional structures are shown. The test head assemblies 12, 14 may either be of the pressure seal type or of the screw-on type. Both types are well known in the art and no claim per se is made for invention in the respective test head assemblies of FIGS. 1-2 and 4-5.

FIGS. 1 and 2 show test head assemblies of the pressure seal type. Test head assembly 12 is of the type to receive a box end of the pipe 28. The test head assembly 14 is configured to receive the pin end of the pipe under test 28. The assemblies 16, 18 have seals 50 which are forcefully driven by known techniques against the pipe under test into a fluid tight seal during testing and then released after testing.

FIGS. 4-5 show test head assemblies 12A, 14A corresponding to the test head assemblies 12, 14 but which are of the alternative, screw-on type. The test assemblies 12A, 14A each employ a threaded member 52, 54 for screwing onto the threaded end of the pipe under test. The threaded member 52 is a plug to be inserted into the threaded box end of the pipe under test 28 and is rotatable by conventional means not shown. For example a swivel coupling for the test head assembly is provided, along with a drive motor. The threaded member 54 is a threaded cap to screw onto the threaded pin end of the pipe under test 28.

The test head assemblies 12 (12A) receives hydrostatic fluid in a conventional manner, but at high pressures, such as up to 20,000 pounds per square inch. The test head assembly 14 (14A) vents air from the pipe under test 28 during filling of the pipe 28 with hydrostatic fluid (such as water) prior to testing. Because the filling and venting features of the known test head assemblies 12, 14 are also known, further description thereof is believed unnecessary.

The following description of the support assemblies 16, 18; of the stress members 30, 32; of the couplers 34, 36; and of the elevating mechanism 38 and pipe cradle 40 will be described in terms of the heads 12, 14. However, it is understood that the description is equally applicable to the similar structures of FIGS. 4-5 bearing the −A numeric suffix.

Referring now to the positioning assemblies, 20, 22, two types of assemblies are depicted for providing a range of axial movement to the respective test heads. FIGS. 1-3 show a first type which releasably clamps to the stress members 30, 32. FIGS. 4-6 show a type which threadingly engages the stress member 30, 32.

The positioning assemblies 20, 22 of FIGS. 1-3 includes a collet assembly 60, a drive mechanism 62, and an anchor 64. The drive mechanism 62 preferably is a hydraulic cylinder 63 directly connected to the anchor 64. The anchor 64 takes the shape of a cross beam locked to the stress members 30, 32. The collet assembly 60 is connected to the piston 66 of the hydraulic cylinder 63 to enable it to be selectively positioned at desired locations on the stress members 30, 32. The locations are selected to allow the respective test head to accommodate different lengths of pipe to be tested; i.e. coarse adjustment. Operation of the cylinder 63 also allows for minor variation of lengths of the pipe under test. As seen in FIG. 2, the anchor 64 includes a serrated shoe 68 which is forcibly wedged against the stress members 30, 32 by a hydraulic cylinder 70.

The collet assembly 60 includes a set of slips 80 commonly coupled by a plate 82. A pair if hydraulically operated cylinders 84 have their bases mounted to the plate 82. The slips 80 include segments 80A, 80B having a tapered outside surface and teeth on the inner surface that engages the outer surface of the respective stress members 30, 32.

The collet assembly 60 also includes a housing assembly 86 which includes housings 88 for the respective slips 80. The housings 88 are commonly coupled by a cross-beam 90. The pistons of the cylinders 84 are connected to the cross-beam 90, and the piston 66 of the cylinder 63 is connected to the cross-beam 90. The respective test head 12, 14 are also secured such as by bolting to the cross-beam 90.

The housing 88 defines a mating tapered bowl for the segments of the slips 80. When the cylinders 84 are actuated by the operator of the tester 10, inward movement of the slips causes a wedging action of the tapered slip segments against the tapered bowl of the respective housings 88 and the stress members 30, 32 respectively. Accordingly, the hydraulic load against the respective test head is retained by, and transferred to, the stress members 30, 32 via the collet assembly 60.

After the hydraulic test and after the hydrostatic fluid has been drained from the pipe under test, the cylinders 84 are extended to release the slips 80 from their binding engagement against the stress members 30, 32. The respective test heads 12, 14 can then be removed from the pipe under test.

As another feature of the embodiment of FIG. 1, the stress members 30, 32 each contain a threaded flange 92. The flange 92 as illustrated in FIG. 1 is of the double male type and allows changing the ends of the stress members 30, 32. This contemplates wear and deformity on those members due to the constant wear caused by operation of the slips 80.

Referring now to FIGS. 4-6, the positioning assemblies 20, 22 are shown to be of the so-called screw type. The cross-beam 90 supports the respective test head 12 (14) and one of any suitable screw-type units 100 which advance relative to a threaded support member. One suitable mechanism is commercially available from Duff-Norton Co. of Charlotte, North Carolina and is marketed under the trade name "Jactuator." The screw-type drive mechanism 100 is secured such as by bolting to the support member 90 and contains threaded female units 102, 104. The female units 102, 104 are respectively coupled to the stress members 30, 32 which are configured to have a threaded male portion 106. A drive sprocket 108 is coupled to the respective female units 102, 104 and engages the threaded male section, 106. A drive motor 109 is connected for driving the sprocket 108 for moving the mechanism back and forth along the male portion 106. Thus, operation of the drive motor 109 advances the respective test head 12, 14 axially with respect to the pipe under test.

As seen most clearly in FIG. 5, the support assemblies 16, 18 include upright posts 110, 112 which are connected to the stress members 30, 32 to support the members at a defined height. The novel positioning assemblies 20, 22 support the respective test heads 12, 14 to have their centerlines coplanar with the centerlines of the stress members 30, 32 and of the pipe 28 under test. Because the positioning assemblies 20, 22 support the test heads such that the stress members 30, 32 are also symmetrically displaced about the pipe 28 under test, the axial pressure exerted on the test heads is transferred equally to the stress members 30, 32 in the plane defined by the axis of the members 30, 32 and pipe 28. This configuration minimizes the risk of moments generated by high forces which can cause undue fatiguing of the respective structures. This could otherwise result in the test heads being stripped off the pipe under test at high velocity.

As seen in FIG. 5, preferably the upstanding posts 110, 112 are supported from a tiltable bed 114. The bed 114 is high strength I-beam and is pivoted at one end 115. A set of hydraulic jacks 116 is supported from a sloped foundation 117 and have their respective pistons connected to the bed 114. The foundation 117 is sloped at a pitch of approximately $1\frac{1}{2}$ degrees when the bed is elevated to a horizontal level. Operation of the jacks 116 allows tilting of the bed 114 and thus of the pipe 28 to an incline of approximately one to two degrees. This facilitates filling of the pipe 28 with hydrostatic fluid.

A set of wheels 118 may be connected, such as by bolts, to the bed 114. In this embodiment, the bed 114 is configured to have a hitch (not shown) at one end in goose-neck tractor style in order that it may be pulled, such as by a truck. The bed 114 and the stress members 30, 32 may be comprised of respective telescopic members in order to shorten the tester 10 for facility in transporting. Because the novel design of the invention reduces mass and thus weight, the tester 10 can readily be moved from location to location by the wheels 118.

Referring to FIGS. 5 and 6, the elevating mechanims 38 and pipe cradle 40 are shown for the embodiment of FIG. 4. The cradle 40 is supported by the elevating mechanism 38 which takes the form of rubber pneumatic lifters 120. The lifters 120 are inflatible rubber cushions which may be inflated with air to elevate the pipe cradle 40 and thus the pipe under test to the desired height. Also, the rubber pneumatic lifters 120 provide a flexible support for the pipe under test so that vertical and horizontal degrees of freedom are provided to the pipe under test. This is especially valuable when threading bent pipe into the test heads as it allows the necessary movement of the bent pipe as it is screwed into the test heads.

With the elevator mechanism 38 which provides the four degrees of freedom of movement of the test pipe necessary to accommodate screwing bent pipe into the test head, it is now possible to provide a relatively inflexible test head assembly, yet have the tester 10 accommodate bent pipe. Specifically, prior art designs have required horizontal and vertical degrees of freedom of the respective test heads assembly in order to accommodate screwing the test head on to bent pipe. Even though the test heads of the screw on type are supported for rotation, the test heads can be firmly supported without vertical and horizontal freedom of movement. Instead the pipe under test floats, thereby allowing the positioning assemblies 20, 22 to be of a strengthened, more reliably safe design.

Referring now to FIGS. 7 and 7a, a novel non-screw on type test head assembly 12B is shown which is especially designed for introducing hydrostatic fluid under high pressure into the pipe under test via a passageway 129. Although the test head assembly 12B is depicted to be the pressure seal type, it is understood that it could suitably be of the so-called screw on type.

The test head assembly 12B includes a housing 126 which is adapted to be supported against the end of the pipe 28 under test. The housing 126 defines a passageway 128 which receives hydrostatic fluid from a line (not shown) coupled to the housing 126 via a valve housing 130. During filling of the pipe 28 prior to high pressure testing, the fluid passes through the passageway 128 at low pressure, such as 30 to 60 pounds per square inch.

An outstanding feature of the test head assembly 12B is the inclusion of a check valve assembly 132. The check valve assembly 132 is supported in the passageway 128 by the housing 126 and includes a valve cone 134 connected to a guide rod 136 which is centralized by a set of guide fins 138 welded to guide rod 136 and slidable within the tube comprising a valve housing 130. The guide fins 138 are supported within the valve housing 130 which is connected to the source of hydrostatic fluid. The guide rod 136 is further supported within the housing 126 by a retainer snap ring 142.

The valve cone 134 is of a truncated conical shape configured to be received by mating surfaces 144 of the housing 126. The cone 134 and rod 136 are spring loaded closed with respect to the housing 126 by means not shown. After filling of the pipe 28, which is at low pressure, the check valve snaps closed prior to the application of high pressure.

An outstanding feature of the check valve is the provision of a captured seal 146. The seal is a generally rounded elastomer ring, for example an O-ring, which is held in place by a generally trapezoidal retaining cavity 148 defined in the surfades 144; i.e. a dove-tail groove in the surfaces 144. The seal 146 is of a diameter to allow a squeeze fit within the cavity 148. The size of the opening to the cavity 148 is selected with respect to the diameter of the seal 146 to prevent the seal from becoming dislodged, yet allowing the seal to be squeezed into the cavity 148. The seal ring protrudes from the cavity 148 a sufficient amount to effect the desired seal.

Thus, when the pipe under test has been filled with hydrostatic fluid, the cone 134 is forced against the surfaces 144 such that the sides of the cone 134 sealingly engage with the ring 146 protruding from the cavity 148.

Referring now to FIGS. 8 and 8a, a test head assembly 14B is shown which advantageously features a novel bleed assembly. As with the test head assembly 12B, the assembly 14B can be of either the seal type or the screw-on type, although the seal type is shown in FIG. 8.

The assembly 14B includes a housing 150 which is configured to receive the end of the pipe under test. The housing 150 defines a passageway 151 which is in fluid communication with the pipe under test. The housing 150 supports a bleed assembly 152 within the passageway 151 such that the assembly 152 extends inside the pipe under test to allow bleeding of air trapped within the pipe to a position outside the pipe. As shown in FIG. 8, the housing 150 also is coupled to a bleed pipe 154 for receiving the air and hydrostatic fluid exhausted from the passageway 151.

The bleed assembly 152 includes a primary vent tube 156 which is of an elongated shape, extending from a first location within the pipe under test to a second location within the bleed pipe 154. The primary vent tube 156 preferably is supported in the passageway 151 to have its centerline coincident with the centerline of the pipe 28 under test. To this end, the primary vent tube 156 is supported by a vent retainer spider 158 mounted to the housing 150 transversely to the axis of the primary vent tube 156. A split elastomer bumper washer 160 is also supported within the housing 150 around the opening of the pasageway 151 to provide a shock absorber and fluid seal between the housing 150 and the end of the pipe under test. The washer 160 provides a pre-pressurizing seal to retain the fill plug pressure without leakage in range of 40-75 psi. As shown in FIG. 8, preferably a single set of screws 162 mounts the washer 160 and the spider 158 to the housing 150.

A plurality of secondary vent tubes 164 is connected in fluid communication to the primary vent tube 156 at transverse angles to define an eductor. As shown in FIG. 8, the preferred and illustrated embodiment provides a set of four vent tubes 164 spaced at equal angles around the primary vent tube 156. The length of the respective vent tubes 164 is such that the end of the tubes 164 is at a third location close to the inside wall of the pipe under test. When using a test head 14B of the seal type as shown in FIG. 8, only a single secondary vent tube 164 is needed. This is because the orientation of the test head 14B with respect to the pipe under test is generally fixed so that the single vent tube 164 can be positioned vertically. However, when employing a screw-on type head preferably four or more vent tubes 164 are utilized. By utilizing a plurality of such tubes, for a given final rotational orientation of the test head 14B with respect to the pipe under test, in all likelihood one of the vent tubes 164 will be substantially vertical within the pipe under test.

Operation of the novel bleed assembly 152 and eductor is according to Bernouli principals. That is, as the pipe under test is filled with hydrostatic fluid, fluid passes through the passageway 151 inside the washer 160. Because the diameter of the passageway 151 and the diameter of the bleed pipe 154 is smaller than the diameter of the pipe under test, the flow rate of the hydrostatic fluid is increased at the end of the primary vent tube 156 positioned within the bleed pipe 154. Because of the increased velocity of hydraulic fluid, the end of the vent tube 156 in the passageway 151 experiences a reduced pressure, tending to draw the trapped air within the pipe under test through the vertical secondary vent tube 164 into the bleed pipe 154.

In the embodiment shown in FIG. 8, the bleed pipe 154 has a three-inch inside diameter, and the inside of the diameter of the pipe under test is on the order of four inches. The vent tubes 164 are spaced approximately 1-2 inches from the bumper washer 160 which is a distance which does not restrict flow of fluid into the passageway 151. The diameter of the plurality of auxiliary vent tubes 164 is approximately 1 inch while the diameter of the primary vent tube 156 is approximately 1½ inches.

It thus will be appreciated that a new and improved pipe tester has been described. It is of a sufficiently light weight design that finds particular advantage as a mobile pipe tester usable in the field. Further, its design, especially use of the particular stress members 30, 32 and positioning assemblies 20, 22, is particularly safe and minimizes dangers accompanying high pressure testers of the type employing test heads secured to the end of pipes under test.

Although rather specific embodiments of the invention have been described herein, it will be appreciated that various modifications will be apparent to those of ordinary skill in the art. Such modifications are within the scope of the invention as hereinafter claimed.

What is claimed is:

1. A tester for hydrostatically testing a length of pipe comprising:
   (a) first and second test heads configured to connect to the respective ends of the length of pipe for applying hydrostatic pressure thereto during testing;
   (b) first and second spaced support assemblies;
   (c) first and second elongated stress members connecting the first and second spaced support assemblies;
   (d) elevating means for supporting the stress members to have their axial centerline substantially coplaner with that of the length of pipe under test;
   (e) positioning means movably supporting at least one of the first and second test heads with respect to the stress members and the support assemblies to define a pipe test location therebetween, wherein said at least one positioning means includes means for advancing the respective test head toward the pipe test location for engaging the respective pipe end; and
   (f) means coupling the positioning means and the stress members for transferring to the stress members axial force applied during testing to said test head; said coupling means including means for releasably securing the respective test head to the stress members, and further including a collet comprising inner and outer wedge-shaped members coacting to effect clamping of the inner wedge-shaped member on the stress member as the inner wedge-shaped member progressably is forced inside the outer wedge-shaped member.

2. The tester according to claim 1 wherein the test heads respectively include a threaded portion for threadingly engaging said pipe end for securing the test head thereto.

3. The tester according to claim 1 wherein the test heads respectively include a seal and means for pressing said seal against the pipe end in fluid tight relationship.

4. The tester according to claim 1 wherein the coupling means is configured to transfer said forces equally to said stress members.

5. The tester according to claim 1 and including:
   (a) a bed for supporting the spaced support assemblies; and
   (b) a set of wheels for movably supporting the bed for mobile operations.

6. The tester according to claim 1 wherein said coupling means includes at least one screw assembly comprising a threaded male portion having its axis substantially coplaner with said stress members and a female portion which is coupled to the respective test head and which coacts with said male portion.

7. The tester according to claim 5 and including means for tilting one end of said bed for tilting said pipe prior to testing for facilitating filling of said pipe with hydrostatic fluid.

8. The tester according to claim 1 and including means for supporting the pipe under test at the elevation of said first and second test head assemblies; wherein said supporting means further includes means for elevating one end of said pipe under test above the other end prior to test and for leveling said length of pipe prior to removal thereof from said tester, thereby to facilitate said removal.

9. A tester for hydrostatically testing a length of pipe comprising:
   (a) first and second test heads configured to connect to the respective ends of the length of pipe for applying hydrostatic pressure thereto during testing;
   (b) first and second spaced support assemblies;
   (c) first and second elongated stress members connecting the first and second spaced support assemblies;
   (d) means for supporting the stress members to have their axial centerline substantially coplaner with that of the length of pipe under test;
   (e) positioning means movably supporting one of the test heads with respect to the stress members and the support assemblies to define a pipe test location therebetween, wherein said one positioning means includes means for advancing the respective test head toward the pipe test location for engaging the pipe end; and
   (f) means coupling the positioning means and the stress members for transferring to the stress members axial force applied during testing to said test head; said coupling means including a collet comprising inner and outer wedge-shaped members coacting to effect clamping of the inner wedge-shaped member on the stress member as the inner wedge-shaped member progressably is forced inside the outer wedge-shaped member.

10. The tester according to claim 1 or 9 wherein said wedge-shaped members define teeth which engage the stress member.

* * * * *

UNITED STATES PATENT AND TRADEMARK OFFICE
CERTIFICATE OF CORRECTION

PATENT NO. : 4,458,522

DATED : July 10, 1984

INVENTOR(S) : Lester W. Toelke

It is certified that error appears in the above-identified patent and that said Letters Patent is hereby corrected as shown below:

Column 2, line 39, "coplaner" should be -- coplanar --.

Column 4, line 3, "extendin" should be --extending --; line 24, "become" should be -- becomes --; line 53, "receives" should be -- receive --.

Column 5, lines 7-8, "includes" should be -- include --; line 24, "if" should be -- of --; line 36, "head" should be -- heads --.

Column 6, line 55, "inflatible" should be -- inflatable --.

Column 7, line 5, "on to" should be -- onto --; line 50, "surfades" should be -- surfaces --.

Column 8, line 52, "principals" should be -- principles --; line 56, "is" should be -- are --.

Column 9, line 36, "coplaner" should be -- coplanar --.

Column 10, line 41, "coplaner" should be -- coplanar --.

Signed and Sealed this

Twelfth Day of March 1985

[SEAL]

Attest:

DONALD J. QUIGG

Attesting Officer     Acting Commissioner of Patents and Trademarks